(12) United States Patent
Joyner et al.

(10) Patent No.: US 11,818,094 B1
(45) Date of Patent: Nov. 14, 2023

(54) SYSTEMS AND METHODS FOR SYNCHRONIZING HOSTNAMES AND IP ADDRESSES IN EMAIL SYSTEMS

(71) Applicant: ZixCorp Systems, Inc., Dallas, TX (US)

(72) Inventors: Bryan Adam Joyner, Sachse, TX (US); Patrick Stephen Trantham, Sunnyvale, TX (US); Mark Albert Mackenzie, McKinney, TX (US); John French Kalan, Dallas, TX (US); William Scott Henderson, Euless, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 0 days.

(21) Appl. No.: 17/897,298

(22) Filed: Aug. 29, 2022

(51) Int. Cl.
*H04L 61/5007* (2022.01)
*H04L 51/48* (2022.01)
*H04L 51/21* (2022.01)
*H04L 61/5053* (2022.01)
*H04L 51/00* (2022.01)
*H04L 61/5061* (2022.01)
*H04L 61/45* (2022.01)

(52) U.S. Cl.
CPC .......... *H04L 61/5007* (2022.05); *H04L 51/00* (2013.01); *H04L 51/21* (2022.05); *H04L 51/48* (2022.05); *H04L 61/45* (2022.05); *H04L 61/5053* (2022.05); *H04L 61/5061* (2022.05)

(58) Field of Classification Search
CPC ......... H04L 51/48; H04L 51/21; H04L 51/00; H04L 61/4511; H04L 61/45; H04L 61/09; H04L 61/50; H04L 61/5007; H04L 61/5053; H04L 61/5061; H04L 61/58; H04L 61/00
See application file for complete search history.

(56) References Cited

U.S. PATENT DOCUMENTS

| | | | |
|---|---|---|---|
| 8,145,788 B1 * | 3/2012 | Love | H04L 61/4511 709/219 |
| 10,411,902 B2 * | 9/2019 | Kalan | H04L 9/3263 |
| 11,582,263 B2 * | 2/2023 | Goldstein | H04L 63/20 |

FOREIGN PATENT DOCUMENTS

JP 2007102747 A * 4/2007

* cited by examiner

*Primary Examiner* — Glenton B Burgess
*Assistant Examiner* — Rachel J Hackenberg
(74) *Attorney, Agent, or Firm* — Sprinkle IP Law Group

(57) ABSTRACT

Systems and methods for the dynamic selection of IP address in email platforms, and the synchronization of hostnames and IP addresses in such platforms, are disclosed.

24 Claims, 5 Drawing Sheets

SYSTEMS AND METHODS FOR SYNCHRONIZING HOSTNAMES AND IP ADDRESSES IN EMAIL SYSTEMS

TECHNICAL FIELD

This disclosure relates generally to electronic mail. In particular, this disclosure relates to the dynamic selection of Internet Protocol (IP) addresses used in sending electronic mail. Even more specifically, embodiments of this disclosure relate to the dynamic selection of IP addresses when sending emails to synchronize IP addresses and hostnames used in the sending of emails.

BACKGROUND

Since the inception of electronic mail (email) the volume of email sent has been constantly increasing. Commensurate with the increase of the use of email generally, the use of email for spam has also increased. Such spam comprises unwanted or unsolicited email messages such as advertising, promotions, or scams, usually sent out in bulk to a large number of recipients. In recent years, spam has become a major problem. Given the negligible cost involved in sending large amounts (e.g., millions or more) of unsolicited email messages, spammers need only a small response rate to make such bulk emailing effective. In fact, by some measures spam currently accounts for over half of all email traffic.

To combat this spam, a wide variety of techniques have been employed. Some of these techniques involve controlling the flow of email through a (e.g., receiving) email gateway, and the delivery of such email to its intended recipients, based on the "reputation" of an IP address from which emails originate. Emails from a "low" reputation IP address may be blocked or otherwise routed as if they are spam, while emails from a "high" reputation IP address may be delivered to their intended recipient. The reputation of an IP address is usually based on a variety of factors, including volume or rate of email sent from the IP address, emails from the IP indicated as, or found to be, spam (e.g., by a recipient), the validity of recipient email addresses for emails originating from the IP address, or other factors.

Theses attempts to curtail spam have not, however, been without ramifications. As the use of email has increased, heavy users of email, such as large enterprises, have employed remote or cloud based email sending platforms for the sending of emails. These email platforms may be useful in implementing security, compliance with regulations governing data movement or storage, archiving of data, or other functionality in conjunction with the sending of email. The use of these types of email platforms thus alleviates enterprises of the need to provide such capabilities themselves. As these email platforms may be used for sending emails from large enterprises, and may be multi-tenant platforms used for multiple enterprises, these email platforms may send an extremely high volume of emails, and may send such emails at a high rate. Thus, in many cases, these email platforms sending legitimate emails may be conflated with spammers and the sending of legitimate emails from these email platforms adversely impacted.

Thus, there is a need for improved systems and methods for sending emails.

SUMMARY

As mentioned above, the use of email has increased. Commensurately, the volume of spam has increased. To combat this spam, a wide variety of techniques have been employed. Some of these techniques involve controlling the flow of email through an (e.g., receiving) email gateway, and the delivery of such email to its intended recipients, based on the "reputation" of an IP address from which emails originate. The reputation of an IP address is usually based on a variety of factors, including volume or rate of email sent from the IP address.

Modern email sending platforms send an extremely high volume of emails, and may send such emails at a high rate. Thus, email sending platforms may be improperly classified as spammers. Email sending platforms employ certain techniques to reduce the risk that the IP addresses they use to send emails are blacklisted or otherwise have their reputation lowered.

Techniques that may be employed to keep such IP addresses from being assigned a low reputation score include "cooling" an IP address by reducing or controlling the volume of emails sent from that IP address, or "warming" an IP address by gradually increasing the volume of email sent from that IP address. Thus, email platforms may have a bank (e.g., multiple) of (e.g., public facing) IP addresses that may be used as the source IP address to send the emails. These IP address can be scheduled for use in an email platform to protect or establish their reputation, or for other reasons.

Such IP selection (scheduling) may be implemented at various locations in such email platforms, such as at a load balancer or the like. A load balancer can receive communications sent by the email server for sending an email. When the load balancer receives such communications the load balancer can select an IP address for use in sending the email (e.g., for Network Address Translation (NAT)), and route the communications (e.g., commands) issued by the mail server for that email to a gateway for the sending of those communications from the selected IP address.

Emails are typically exchanged using a protocol such as Simple Mail Transfer Protocol (SMTP), an internet standard communication protocol for electronic mail transmission. In the SMTP protocol such communications for sending an email may include a HELO or EHLO command, a MAIL FROM command, an RCPT TO command, a DATA command, etc. In such protocols it may be a requirement that the email server send certain of these commands (e.g., a postfix server may be required to send a HELO or EHLO command) or that certain of these commands (e.g., a HELO or EHLO command) identify a hostname from which the email is originating. Because of practical or imposed limits on the number of IP addresses that may be assigned to a hostname or a mail server, email platforms, especially large email platforms designed for bulk sending of emails, may use multiple hostnames. Each of these hostnames may be assigned, or otherwise associated with, certain IP addresses of the bank of IP addresses utilized by that email platform (e.g., in a Domain Name registry).

A common technique used by spammers is to spoof such hostnames when sending spam email in an attempt to make the email message appear to be coming from one domain when, in fact, it is being sent from a different domain. Thus, as another technique to mitigate spam, recipient email gateways have taken to confirming other aspects of a sender during the exchange of email between a sender and the recipient mail server.

To confirm a sender of email is legitimate the recipient of the email (e.g., a mail server at the recipient's domain) may perform a reverse DNS (rDNS) lookup on the IP address from which the email was sent (e.g., associated with the connection between the sender and the recipient) to determine the hostname associated with the source IP address of the communication. If the hostname obtained from the rDNS lookup of the source IP address matches the hostname included in the communication (e.g., a HELO or EHLO command received from the sender) the email may be deemed legitimate, while if the two hostnames do not match the email may be considered spam (or otherwise illegitimate).

When a mail server sends an email in an email platform sends communications (e.g. a HELO or EHLO command) identifying a hostname, this hostname may be selected from the bank of hostnames without regard to any IP address that may be used to actually send the communication. Similar to the selection of the hostname identified in the communication (e.g., HELO or EHLO command), the selection of the IP address to send the communication may be accomplished substantially without regard to the identified hostname.

Consequently, in such scenarios it is often the case that the IP selected (e.g., by a load balancer) for sending of the email is not associated with the hostname presented by the mail server in communications (e.g., HELO or EHLO commands) sent by the mail server. In these situations, when a rDNS lookup is performed by the recipient based on the IP address from which the communications were sent, the hostname determined from the rDNS lookup of this source IP address may not match the hostname received in the communication. As a result the receiving mail server may reject the incoming email (e.g., as spam), identify the source IP address of the email as a bad IP address, or take another action detrimental to the sending or reception of the email or the email platform.

What is desired then, is to synchronize the hostname presented in communications from the mail server with the source IP address used to send such communications in distributed email sending platforms where multiple IP address and hostnames may be utilized. This synchronization of hostnames and IP addresses is not, however, straightforward. In many cases, connections may be established before certain communications are sent. For example, when sending an email via SMTP a connection to the destination server may be established (e.g., from an IP address) before any commands (e.g., HELO or EHLO commands including the hostname) are actually sent. Thus, to synchronize the hostname presented in a communication it may be necessary to determine an IP address and associated hostname to utilize before such a connection is ever established, and to utilize both that IP address and that hostname for each communication (e.g., requiring a hostname).

Embodiments as presented herein may thus provide for such synchronization of hostnames and IP addresses in email platforms. Specifically, embodiments as disclosed may dynamically determine an IP address that will be used to send an email at, or before, the sending of the email from the email platform, where that IP address is mapped to a hostname associated with that IP address. A port identifier associated with that hostname can be provided to the mail server sending the email, which uses the identified hostname associated with the IP address as a provided hostname for communications when sending the email (e.g., such as including the identified hostname in a HELO or EHLO command).

Specifically, in one embodiment, the mail server sending an email may send a request to a service on a remote location such as a load balancer or another remote location such as an IP service or the like. The service at the remote location may select an IP address that will be used for sending the email, and return a port identifier associated with the selected IP address and the hostname mapped to that selected IP address. The mail server can thus determine the hostname associated with the selected IP address based on the mapping between the port identifier and hostname. The mail server can send communications, including those providing the determined hostname, on a destination port associated port identifier. The IP address associated with this source hostname can be used by the email sending platform as the source IP address for sending these communications to the destination.

In one embodiment, for example, a service at a load balancer may be listening on a port associated with the port identifier. When a communication is received on that port, the port identifier may be utilized to determine the IP address selected for sending that email based on the mapping between port identifiers and IP addresses. The load balancer can facilitate the sending of the communications from that previously selected IP address. Moreover, when sending such communications the load balancer may override the destination port specified in the communication associated with the port identifier to a standard destination port identifier such as port 25 when SMTP is utilized.

Here, when a rDNS lookup is performed by the recipient of these communications based on the source IP address from which the communications were sent (e.g., the IP address on which a connection was established), the hostname determined from the rDNS lookup of this source IP address will match the hostname received in the communication. As a result the receiving mail server may allow the email to be delivered to the recipient in a normal fashion (e.g., it may not be identified as spam, slowed, or routed to a junk folder, etc.).

Embodiments as presented herein may thus have a number of advantages. As one advantage, embodiments prevent emails from being incorrectly identified as spam and protect the reputation of IP addresses utilized by email platforms by ensuring that hostnames provided in communications originating from the email platform are synchronized with the IP addresses used to send such communications. Moreover, embodiments may improve or automate the IP selection process as the IP selection process can be implemented in a manner that employs logic for intelligent, dynamic (e.g., real-time) selection of IP addresses when sending emails.

As another advantage, the process of specifying IP addresses to utilize, and the rules for the dynamic selection of such IP addresses may be easily managed by providing an administration interface for the configuration of IP addresses, hostnames, or selection rules. For example, certain embodiments may allow an administrator of an email platform to easily configure the set of public facing IP addresses from which emails will originate. Mail coming from the set of mail servers of the email platform would originate from any one of the set of IP addresses at any given time, allowing the administrator to add or remove IP addresses as needed. An administrator could also utilize such an interface to define IP selection rules, such as logic for defining rates at which IP address may originate mail or how often such IP addresses may be selected.

Thus, risky manual configuration changes (e.g., on a load balancer or affecting the entire email platform) can be replaced with an automated approach to configure and validate IP addresses or their selection process. Moreover, these changes may be easily audit and an audit trail of the configuration changes maintained. Accordingly, the functionality typically performed manually (e.g., warming or cooling of IP addresses, monitoring or adjusting the send rate of emails from an IP address, etc.) may be automated through configuration of an IP selection service (e.g., through an administrator interface).

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
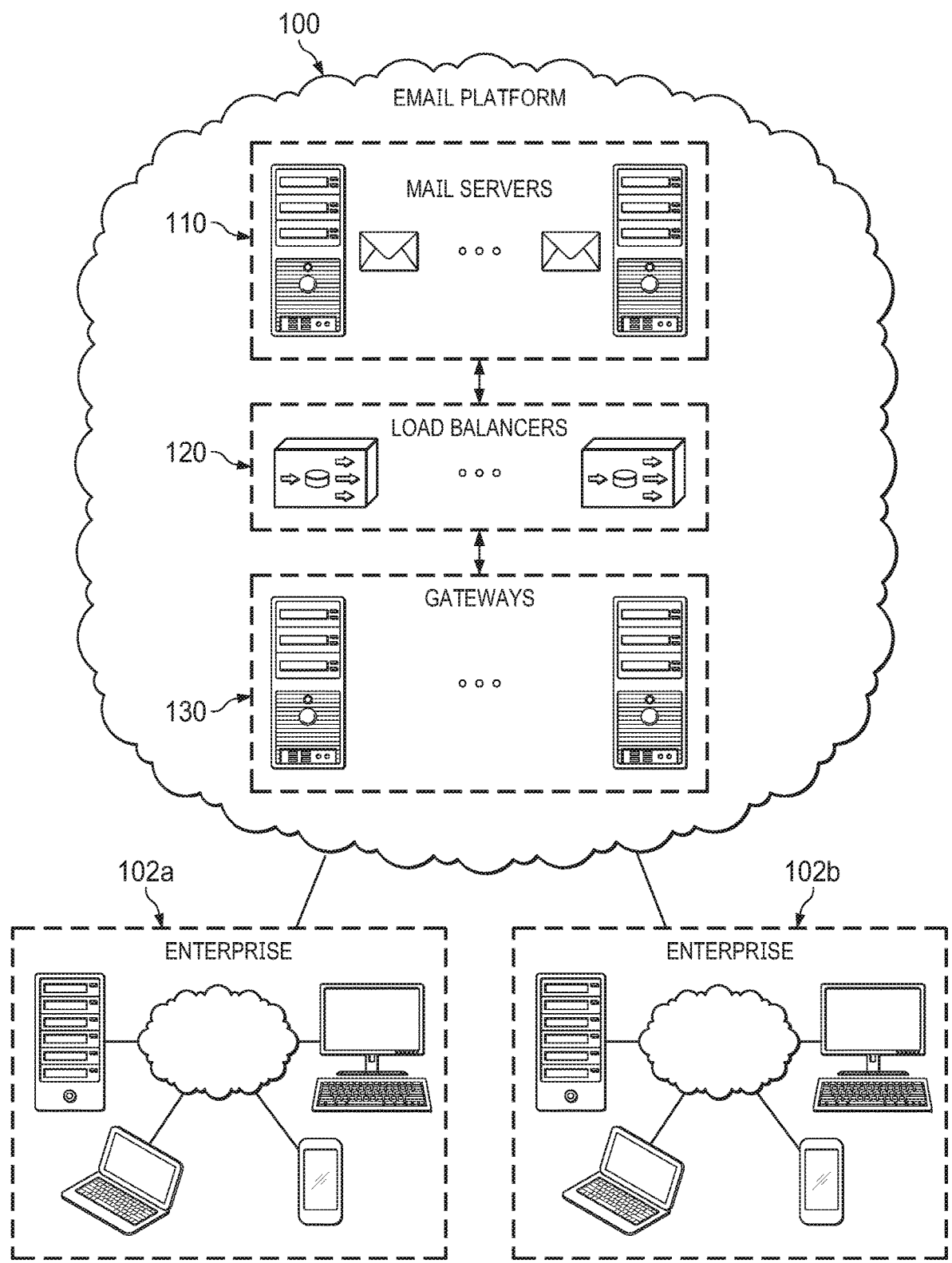
FIG. 1 is a block diagram of a networked computing environment including an embodiment of email platform.

The disclosure and various features and advantageous details thereof are explained more fully with reference to the exemplary, and therefore non-limiting, embodiments illustrated in the accompanying drawings and detailed in the following description. It should be understood, however, that the detailed description and specific examples, while indicating the preferred embodiments, are given by way of illustration only and not by way of limitation. Descriptions of known programming techniques, computer software, hardware, operating platforms, and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before describing embodiments in detail, it may be helpful to discuss some context around document analysis systems. As discussed herein, as the use of email has increased so has the volume of spam. To combat this spam, a wide variety of techniques have been employed. Some of these techniques involve controlling the flow of email through an (e.g., receiving) email gateway, and the delivery of such email to its intended recipients, based on the "reputation" of an IP address from which emails originate. Emails from a "low" reputation IP address may be blocked or otherwise routed as if they are spam, while emails from a "high" reputation IP address may be delivered to their intended recipient. The reputation of an IP address is usually based on a variety of factors, including volume or rate of email sent from the IP address, emails from the IP indicated as, or found to be, spam (e.g., by a recipient), the validity of recipient email addresses for emails originating from the IP address, or other factors.

Modern email sending platforms may also send an extremely high volume of emails, and may send such emails at a high rate. Because the volume or rate of emails originating from an IP address is a significant factor in reputational scoring of IP address, IP addresses utilized by email sending platforms may be classified as "low" reputation solely (or in large part) based on the number or rate of emails sent from that IP address, even if such email is legitimate. This situation usually requires email sending platforms to adapt certain techniques to reduce the risk that the IP addresses they use to send emails are not blacklisted or otherwise have their reputation lowered to the point where they are identified as a source of spam (e.g., where destination email servers may reject or slow emails coming from that IP address).

Techniques may be employed to keep such IP addresses from being assigned a low reputation score, such as "cooling" an IP address by reducing or controlling the volume of emails sent from that IP address. When an IP address does have a low reputation or is otherwise identified as a source of spam, in most cases the reputation of the IP address must be ameliorated before the IP address may again be used as a source for sending emails (e.g., that will not be rejected or slowed by a destination system). This amelioration process usually involves stopping the use of the IP address for sending emails for a period of time followed by performing a "warming" of that IP address. IP warming, or IP warm-up, (re)establishes a reputation for a new IP, or an IP that has not been used for some time, and involves sending email from the IP address starting with small volumes and gradually increasing the volume of email sent from that IP address (e.g., each, hour, day, or week). The techniques for scheduling the use of IP addresses in such cooling or warming (or in general to preventing the lowering of the reputation of an IP address) may be based on time, or other criteria such as statistics or other data associated with the IP addresses. The scheduling of these IP addresses is not straightforward, and may have consequences of its own.

Turning then to FIG. 1, a block diagram of a networked computing environment including an embodiment of email platform is depicted. Email platform 100 may be multi-tenant platforms used for sending (or receiving) emails for multiple enterprises 102 (e.g., 102a, 102b). Email sending platform 100 typically has a number of email servers 110 (e.g., postfix servers or another type of Mail Transfer Agent such as sendmail, Qmail, Exchange, etc.) for sending emails. It will be understood here that the terms email (transfer) agent, server, and relay will all be used interchangeably for purposes of this disclosure without loss of generality. Emails to be sent by the email platform 100 may be provided to one of the email servers 110 such that the email server 110 is responsible for sending that email to the specified destination associated with that email.

To scale to a large number of users or volume of emails, these types of email sending platforms 100 may have a bank (e.g., multiple) of (e.g., public facing) IP addresses that may be used as the source IP address to send the emails. As discussed, the use of a bank of (public) IP addresses in this manner may be implemented in association with some form of selection process (e.g., scheduling) by which IP addresses are selected (e.g., random, round robin, based on data, etc.) by the email platform 100 for use as the source IP address for sending the email. These email platforms 100 may also leverage these selection processes to manage the reputation of the IP address they employ. For example, IP addresses can be scheduled in a manner that reduces the likelihood of IP address garnering a "low" reputation score, such as removing the IP address from the bank of IP addresses used as source IP addresses and reintroducing it to the bank at a later point. The IP address can then be scheduled for use in a manner that "warms" the IP address (e.g., based on a schedule, based on the IP addresses reputation, etc.).

Such IP selection (scheduling) may be implemented at various locations in such email platforms 100. As but one example, in these email platforms 100 one or more load balancers 120 are often times situated between the email server 110 sending the email and the gateway 130 actually used to send the communications for the email over the network to the destination. Load balancers 120 include devices that distributes network or application traffic across a number of devices (e.g., physical or virtual) or applications. Thus, as used herein a load balancer will be understood generally to be any system that is used to facilitate the sending of emails from the email servers 110 in an email platform 110. In certain email sending platform architectures, the load balancer 120 may thus perform IP selection (e.g. scheduling) for use in sending an email. Communications for sending the email are sent from the email server 110 and may be received by the load balancer 120.

Specifically, emails are typically exchanged using a protocol such as Simple Mail Transfer Protocol (SMTP), an internet standard communication protocol for electronic mail transmission. In the SMTP protocol such communications for sending an email may include a HELO or EHLO command, a MAIL FROM command, an RCPT TO command, a DATA command, etc. It may be a requirement of such protocols that the email server 110 sends certain of these commands (e.g., a postfix server may be required to send a HELO or EHLO command). The load balancer 120 thus receives the communications sent by the email server 110 for sending the email. When the load balancer 120 receives such communications the load balancer 120 can select an IP address for use in sending the email, and route the communications (e.g., commands) issued by the mail server 110 for that email to a gateway 130 for the sending of those communications from the selected IP address.

Certain of the communications sent by a mail server 110 when sending an email may identify a hostname from which the email is originating. As part of the communications (e.g., commands) exchanged in these protocols, a hostname (used herein to encompass a domain name, fully qualified domain name, hostname, some combination, etc.) may be sent from the sender to the recipient (e.g., for example in a HELO or EHLO command used by the SMTP protocol). Email sending platforms 100 may have one or more assigned hostnames. Accordingly, when such communications are sent by the mail server 110 in an email sending platform 100 these communications may identify one of the hostnames associated with the email platform 100.

A common technique used by spammers is to spoof such a hostname when sending spam email in an attempt to make the email message appear to be coming from one domain when, in fact, it is being sent from a different domain. Thus, as another technique to mitigate spam, recipient email gateways have taken to confirming other aspects of a sender during the exchange of email between a sender and the recipient mail server.

To confirm a sender of email is legitimate the recipient of the email (e.g., a mail server at the recipient's domain) may perform a reverse DNS (rDNS) lookup on the IP address from which the email was sent (e.g., associated with the connection between the sender and the recipient) to determine the hostname associated with the source IP address of the communication. If the hostname obtained from the rDNS lookup of the source IP address matches the hostname included in the communication (e.g., a HELO or EHLO command received from the sender) the email may be deemed legitimate, while if the two hostnames do not match the email may be considered spam (or otherwise illegitimate).

Because of practical or imposed limits on the number of IP addresses that may be assigned to a hostname or a mail server 110, email platform 100 may have a bank of hostnames that are used to send emails. Each of these hostnames may be assigned, or otherwise associated with, certain IP addresses of the bank of IP addresses utilized by that email platform 100. Thus, the mail server 110 sending an email in such an email platform 100 sends communications (e.g. a HELO or EHLO command) identifying a hostname selected from the bank of hostnames (or assigned to the email server 110) without regard to any IP address that may be used to actually send the communications to the destination (e.g., from the load balance 120). These communications are received at the load balancer 120 and the IP selected (e.g., by the load balancer 120) for sending the email is used to actually send the communications. Similar to the selection of the hostname identified in the communication (e.g., HELO or EHLO command), the selection of the IP address at the load balancer 120 may be accomplished substantially without regard to the hostname identified in the communications. Instead, the selection may be done based on a random, round robin or data based (or other) selection methodology, as discussed.

Consequently, in such scenarios it is often the case that the IP selected by the load balancer 120 for sending of the email (i.e., the communications for sending the email) is not associated with (e.g., assigned to) the hostname presented by the mail server 110 in communications (e.g., HELO or EHLO commands) sent by the mail server 110 when sending the email. In these situations, when a rDNS lookup is performed by the recipient (e.g., the receiving mail server) based on the IP address from which the communications were sent, the hostname determined from the rDNS lookup of this source IP address may not match the hostname received in the communication. As a result the receiving mail server may reject the incoming email (e.g., as spam), identify the source IP address of the email as a bad IP address, or take another action detrimental to the sending or reception of the email or the email platform 100.

What is desired then, is to synchronize the hostname presented in communications from the mail server with the source IP address used to send such communications, including synchronizing IP addresses with hostnames in distributed email sending platform where multiple IP address and hostnames may be utilized.

To address these desires, among others, attention is now directed to embodiments for synchronizing hostnames and IP addresses in email platforms. Specifically, embodiments as disclosed may dynamically determine an IP address that will be used to send an email at, or before, the sending of the email from the email platform, where that IP address is mapped to a hostname associated with that IP address. An identifier associated with that hostname can be provided to the mail sender, which uses the identified hostname associated with the IP address as a provided hostname for communications when sending the email (e.g., such as including the identified hostname in a HELO or EHLO command). The IP address associated with this source hostname can be used by the email sending platform as the source IP address for sending these communications to the destination.

Here, when a rDNS lookup is performed by the recipient based on the source IP address from which the communications were sent, the hostname determined from the rDNS lookup of this source IP address will match the hostname received in the communication. As a result the receiving mail server may allow the email to be delivered to the recipient in a normal fashion (e.g., it may not be identified as spam, slowed, or routed to a junk folder, etc.).

Figure 2A:
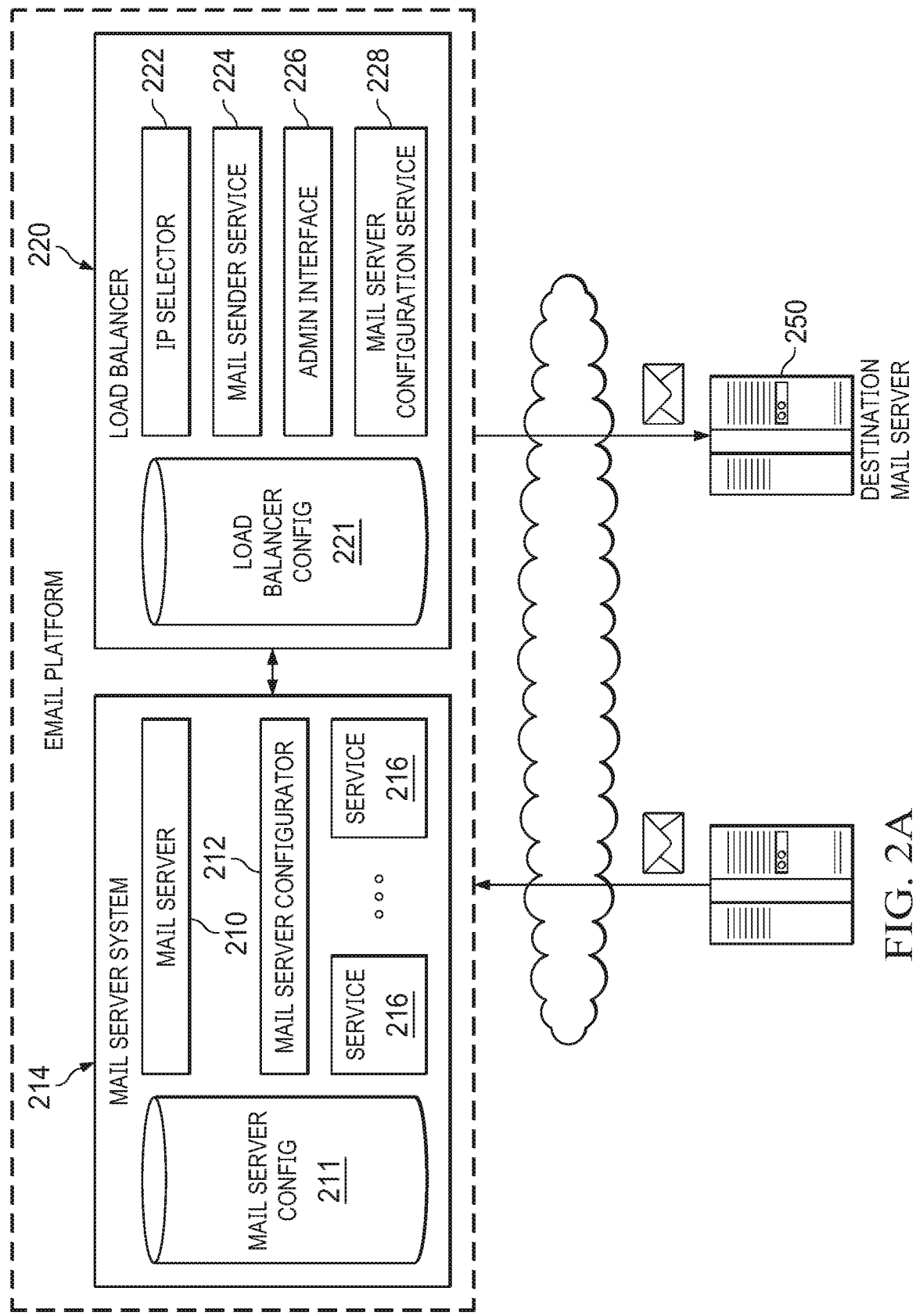
FIG. 2A is a block diagram of a networked computing environment including an embodiment of email platform.

Moving now to FIG. 2A, a block diagram of a networked computing environment including an embodiment of an email platform for synchronizing hostnames with IP addresses is presented. Email platform 200 may have a bank of public facing IP addresses from which email can be sent. Each of these IP addresses may be associated with hostname, such that the IP address is associated with the hostname in a domain name registry. Email platform 200 may receive emails for sending to a destination (e.g., through destination mail server 250). These emails may be provided to a mail server 210 (e.g., on mail server system 214) of the platform 200 for sending. The actual source IP address to be used to send an email in such an email platform 200 (e.g., a public IP address to use for Network Address Translation (NAT)) can be selected at a location remote from the mail server 210 used to send the email, such as at a load balancer 220. An identifier associated with the hostname mapped to the selected source IP address can be communicated from load balancer 220 to the mail server 210. Based on this identifier as received at the mail server 210, the hostname mapped to the selected source IP address can be determined by the mail server 210 and used as the source hostname in sending communications for the email (e.g., such as including the identified hostname in a HELO or EHLO command).

These communications can be received at the same (or another) remote location, such as the load balancer 220. The (e.g., previously selected) source IP associated with the hostname can then be determined based on the communication and used to send to the communications to the destination. In particular, the communications sent from the mail server 210 may be associated with an identifier associated with the source IP address. Thus, this identifier can be used at the load balancer 220 to determine the source IP address to be used in sending the communications.

According to one embodiment, the identifier associating the source IP address with the hostname may be a port identifier. When a mail server 210 is preparing to send an email (e.g., before any connection is established to a recipient's domain) the mail server 210 may request an identifier (e.g., for a hostname) for sending the email from the load balancer 220. The load balancer 220 may select a source IP address that will be used in sending the email (e.g., communications involved in sending the email). The load balancer 220 can access a load balancer configuration 221 mapping between IP addresses and port identifiers and return a port identifier mapped to the source IP address selected by the load balancer 220 for sending the email. This port identifier does not have to be an identifier associated with an actually available or utilized port. Instead, the port identifier may just be an identifier composed of alphanumeric or non-alphanumeric characters (or other identifier) that can be used as a port identifier (e.g., for a destination port) when sending communications. For example, the port identifier may be (or be included in or encompass) an identification of a service (e.g., a service name), or may be used to construct the name of a service, that is adapted to utilize the identified port as the destination port when sending communications.

The mail server 210 sending the email may receive this port identifier and may send communications for sending that email using (e.g., including) a source hostname associated with the source IP address selected at the load balancer 220, where those communications are sent using the identified port as the destination port for the communications. Specifically, the mail server 210 can utilize a mail server configuration 211 mapping between port identifiers and hostnames to determine the hostname associated with the port identifier, and use that determined hostname as the source hostname for the communications.

In cases where the port identifier is (or is included in) a service name (or a service name is constructed based on the port identifier), the mail server 210 can use the named service to send the communication (e.g., by calling the named service to send the communication). This service may be adapted to send communications using the source hostname associated with the port identifier and using the identified port as the destination port. Thus, for example, the mail server 210 may send a HELO or EHLO command identifying the source hostname and using the identified port as the destination port using (e.g., by calling) the service identified by (or constructed from) the returned port identifier.

Accordingly, a remote location such as load balancer 220 or the like may receive communications for sending emails from the mail servers 210 at the email sending platform. When a communication for sending an email originating at a mail server 210 is received at the load balancer 220 at the email platform 200, the load balancer 220 can determine the destination port specified in association with the received communication. Based on the identified port associated with the communication the load balancer 220 may access the load balancer configuration 221 mapping between IP addresses and port identifiers to determine the source IP address previously selected for sending that email (e.g., by the load balancer 220 or a different remote location). The load balancer 220 can then facilitate the sending of that communication from the selected source IP address.

Moreover, as discussed the destination port specified in the communication received at the load balancer 220 (e.g., as sent from the mail server 210) does not have to be an identifier associated with an actually available, utilized, or privileged port. Thus, to prevent the rejection of these communications the load balancer 220 may override the destination port specified in the communication (e.g., using the port identifier) to a standard destination port identifier. For example, when the SMTP protocol is utilized port 25 may be utilized as the standard port identifier, such that when communications are sent they are sent from the selected source IP and specify port 25 as the destination port.

In one embodiment, load balancer 220 may be configured with load balancer configuration 221 comprising a lookup table (or other data structure) associating port identifiers with IP addresses and hostnames. For example, the load balancer at a remote location may be an F5 load balancer and the lookup table may be configured as a datagroup at the load balancer. An example of a such a lookup table is:
25000:=helo=mtout-dal-rq-rzx.zixtest.com; snat_ip=63.71.10.197; next_hop=63.71.10.193%2
25001:=helo=mtout-dal-rq-rzy.zixtest.com; snat_ip=63.71.10.198; next_hop=63.71.10.193%2

25002:=helo=mtout-dal-rq-sqq.zixtest.com; sna-
t_ip=63.71.10.200; next_hop=63.71.10.193%2
25003:=helo=mtout-dal-rq-sqr.zixtest.com; sna-
t_ip=63.71.10.201; next_hop=63.71.10.193%2
where, for example 25000 is a port identifier associated with the hostname "mtout-dal-rq-rzx.zixtest.com" and the IP address 63.71.10.197, 25002 is a port identifier associated with the hostname "mtout-dal-rq-rzy.zixtest.com" and the IP address "63.71.10.198", etc.

Each mail server 210 of the email platform 200 may be configured accordingly so the same port identifiers are associated with the same hostnames. Such a configuration may be stored in mail server configuration 211. For example, when the mail server 210 is a postfix mail server the mail server configuration 211 may include the master.cf file of the mail server 210. This master.cf file may identify a set of services 216 of the mail server 210, where each service 216 specified in the master.cf file has a service name associated with (e.g. based on) a corresponding port identifier. The services 216 identified in the master.cf file are adapted to send communications using the port identifier associated with the name of that service and specifying the hostname associated with that port identifier.

Continuing with the above example, a master.cf file for a mail server 210 in accordance with the port identifiers and hostnames of the example above may be:
smtp-25000 unix - - n - 250 smtp -o syslog_name=smtp-25000 -o smtp_tcp_port=25000 -o smtp_helo_name=mtout-dal-rq-rzx.zixtest.com
smtp-25001 unix - - n - 250 smtp -o syslog_name=smtp-25001 -o smtp_tcp_port=25001 -o smtp_helo_name=mtout-dal-rq-rzy.zixtest.com
smtp-25002 unix - - n - 250 smtp -o syslog_name=smtp-25002 -o smtp_tcp_port=25002 -o smtp_helo_name=mtout-dal-rq-sqq.zixtest.com
smtp-25003 unix - - n - 250 smtp -o syslog_name=smtp-25003 -o smtp_tcp_port=25003 -o smtp_helo_name=mtout-dal-rq-sqr.zixtest.com Here, then, the service 216 identified by "smtp-25000" may be adapted to send a communication (e.g., a HELO or EHLO command) specifying the hostname "mtout-dal-rq-rzx.zixtest.com" and specifying port 25000 as the destination port, the service identified by "smtp-25001" may be adapted to send a communication specifying the hostname "mtout-dal-rq-rzy.zixtest.com" and specifying port 25001 as the destination port, etc.

In some cases, each mail server 210 may be configured based on the configuration 221 at the load balancer 220. For example, each mail server 210 may have a mail server configurator 212 that can execute (e.g., at some regular time interval as a cron job or the like). The mail sever configurator 212 may request mail server configuration data from a mail server configuration service 228 at the load balancer 220. Thus, the mail server configuration service 228 may receive such a request and obtain the configuration data (e.g., from load balancer configuration file 221 including the lookup table comprising the mapped port identifiers, hostnames, and IP addresses) at the load balancer 220 to return mail server configuration data including the port identifiers and the hostnames.

The mail server configurator 212 at the mail server 210 may take the returned configuration data mapping the port identifiers with the hostname and the IP address and store this configuration data in a mail server configuration file 211 at the mail server 210 mapping the port identifiers with the hostnames. The mail server configurator 212 may also validate the configuration data before storing the configuration data. For example, the mail server configuration data may be returned as JavaScript Object Notation (JSON). This JSON may be validated by the mail server configurator 212 at the mail server 210 (e.g., to make sure it is well formed) before it is stored in or used to update the configuration file 211.

In embodiments where the mail server 210 is a postfix mail server, the local configuration file 211 at the mail server may be a master.cf file including the names of services that may be utilized by the mail server. The mail server configurator 212 can thus configure the master.cf of the mail server 210 according to the mail server configuration data returned from the request to the mail server configurator service 228 as discussed above such that each service entry in the master.cf file has a service name with a corresponding destination port (e.g., the port identifier or associated with the port identifier) and a hostname (e.g., to be utilized in HELO or EHLO commands).

Thus, data records of the configuration file 221 (e.g., at load balancer 220) may map a port number, a postfix service name, a hostname, and a public IP for NAT. Each (postfix) mail server 210 is configured with master.cf service entries corresponding to the data records (service name, destination port number, and HELO/EHLO hostname to utilize) at the load balancer 220. The port identifier used in the data records may be in a particular range (e.g., a special range that are unutilized or not privileged ports such as 25000-25999). The load balancer at the remote location may thus be configured to detect connections from postfix servers to destination ports in a special range of port identifiers mapped in the data records.

Thus, when an email platform 200 receives an email to be sent to a destination 250, that email may be routed to a mail server 210 of the email platform 200. The mail server 210 can then request an identifier from the load balancer 220 (e.g., where the identifier is associated with a hostname. In one embodiment, for example, the mail servers 210 in an email platform 200 may be postfix mail servers. Load balancer 220 may have a IP selector service 222 which may be adapted to service requests including table lookup commands such as, for example, a postmap command, a command according to the tcp_table protocol, or another type of command. In particular, the IP selector 222 may be TCP based service configured as a listener on a port associated with such a table lookup command. The mail server 210 can issue a transport lookup or the like using a tcp table lookup command which can specify, for example, the destination (or a portion thereof such as username and domain, just domain data, etc.) for the email which is being sent.

The IP selector 222 at the load balancer can thus receive such a table lookup command from the mail server 210. Based on this table lookup command specifying the destination for the email, the load balancer 220 can then determine an IP address from the configuration file 221 (e.g., the datagroup of data records including IP addresses mapped to port identifiers and hostnames in an F5 load balancer) to utilize for sending the email to the destination. Specifically, IP selector 222 at the load balancer 220 may determine a (public) IP address (with an associated hostname) to utilize for sending the email (e.g., an IP address that will be used for NAT when sending communications from the mail server 210 to the destination). The selection of the IP address may be made based on almost any criteria desired. For example, rules may be used for IP selection that may be adapted to warm or cool IP addresses. Such rules could be based, for instance, on a current reputation or other data (e.g., statistics) associated with the each (or a subset) of the bank of IP addresses as maintained by the email sending platform 200 or as obtained from third party source may be utilized in such IP selection. As some examples, IP selection may be based on a destination, throttling limits, a reputation metric such as volume of mail sent using the IP address or the presence of the IP on a grey or black list, or other data.

In this manner, the reputation of such IP addresses may be better managed or audited, and errors reduced, through the intelligent and dynamic selection of such IP addresses. IPs can be easily added or removed from the bank of IP addresses to be utilized as source IP addresses (e.g., through an administrator interface 226 of the load balancer 220). For example, associated throttling limits may be configured for recipient mail systems. Audits and logs may be easily established and updated and IP reputations more easily observed and controlled.

In any event, when an IP address is selected by the IP selector 222, the IP selector 222 at the load balancer 220 may access the configuration file 221 to determine the port identifier associated with the selected IP address. This port identifier can then be returned to the mail server 210 in response to the request (e.g., lookup command) issued by the mail server 210. In some cases, the port identifier may be (or be included in or encompass) an identification of a service (e.g., a service name), or may be used to construct the name of a service, that is adapted to utilize the identified port as the destination port when sending communications. Thus, a service name associated with the port identifier may be returned from the IP selector 222 to the mail server 210. For example, if the selected IP determined by the IP selector 222 based on the request from the mail server 210 is 63.71.10.197, the IP selector 222 may return the service name "smtp-25000" to the mail server 210, identifying a service adapted to send communications to destination port 25000 identifying the hostname mtout-dal-rq-rzx.zixtest.com associated with IP address 63.71.10.19, as illustrated above.

Based on the response (e.g., the port identifier) from the load balancer 220 to the request (e.g., the table lookup command), the mail server 210 can send a communication (e.g., HELO or EHLO command) for sending the email using (e.g., including or providing) the hostname associated with the source IP address selected at the load balancer 220, where the communication is sent using the identified port as the destination port for the communication. Specifically, the mail server 210 can utilize mail server configuration 211 mapping port identifiers and hostnames as configured at the mail server to determine the hostname associated with the port identifier and use that determined hostname as the source hostname for the communication.

In one embodiment, the mail server 210 may use the service 216 identified by the returned port identifier to send the communication. This communication can be a HELO or EHLO command to the destination email server 250 at the destination for the email. This communication may be sent on the port identified by the port identifier in the range of port identifiers on which a mail sender service 224 of the load balancer is adapted to detect connections. Again, continuing with the above example, the mail server may send a HELO or EHLO command providing the hostname mtout-dal-rq-rzx.zixtest.com and send on port 25000.

Accordingly, the load balancer 220 may receive communications for sending emails from the mail servers 210 at the email platform 200. These communications may be received by mail sender service 224 on the range of ports for which it is configured to listen (e.g., ports 25000-25999). When a communication for sending an email originating at mail server 210 is received at the mail sender service 224 of load balancer 220, the mail sender service 224 can determine the destination port associated with the received communication. This determination can be made, for example, based on the port in the special range on which the mail sender service 224 detected the communication from the mail server 210. In the above example, the identified destination port may be port 25000. Based on the identified port associated with the communication the mail sender service 224 may access the load balancer configuration 221 based on the port identifier to determine the associated source (public) IP address previously selected for sending that email (e.g., that should be used for NAT). The mail sender service 224 can then facilitate the sending of that communication from the selected source IP address.

Moreover, as discussed the destination port used to send the communication received at the mail sender service 224 (e.g., as sent from the mail server 210) may be in a special range of ports that are unutilized or are not privileged (e.g., may be non-standard). Thus, the mail sender service 224 may override the destination port of the received communication (e.g., the original destination port specified by the associated port identifier) to a standard destination port identifier. For example, when the SMTP protocol is utilized, port 25 may be utilized as the standard port identifier, such that when communications are sent they are sent from the selected source IP and specify port 25 as the destination port. With respect to the above example then, the mail sender service 224 may receive a HELO or EHLO command on port 25000 specifying the hostname mtout-dal-rq-rzx.zixtest.com the mail sever 210. The mail sender service 224 can then send this HELO or EHLO command specifying the hostname mtout-dal-rq-rzx.zixtest.com to the destination email server 250 from the source IP address 63.71.10.19 (associated with port identifier 25000) on port 25.

Figure 2B:
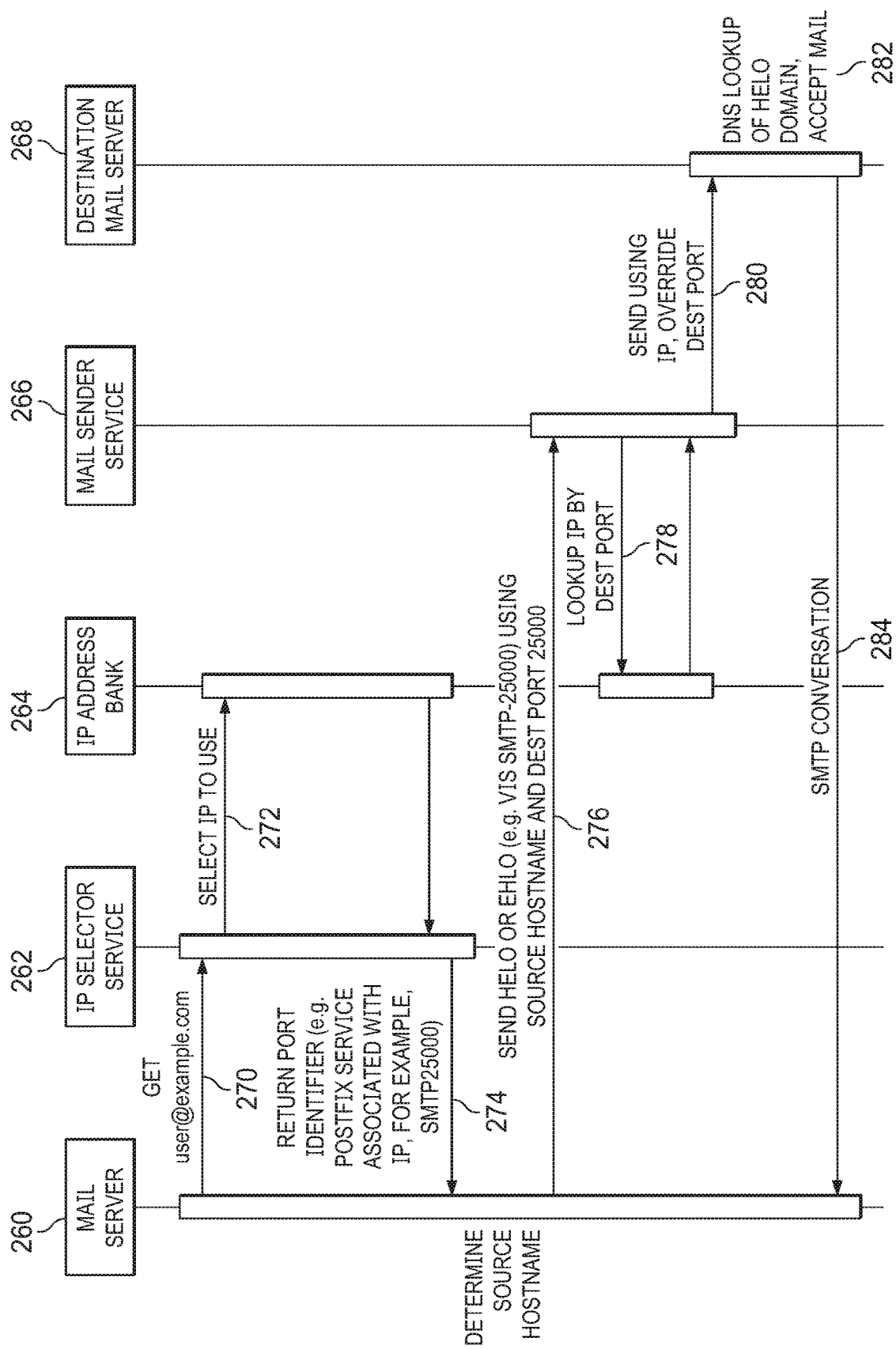
FIG. 2B is a flow diagram of one embodiment of synchronizing IP addresses and hostname in an email platform.

Embodiments may be understood with reference to FIG. 2B which is a flow diagram of one embodiment of synchronizing IP addresses and hostnames in an email platform. As discussed, when an email platform receives an email to be sent to a destination (e.g., user@example.com) the email may be routed to a mail server 260, which may be a postfix server or the like operating according to the SMTP protocol.

The mail server 260 may send a request (STEP 270) including a table lookup command such as, for example, a postmap command or the like to the IP selector service 262, which may be TCP based service configured as a listener on a port associated with such a table lookup command. The request may specify the destination (or a portion thereof such as username and domain, just domain data, etc.) for the email which is being sent (e.g., here user@example.com).

The IP selector service 262 can receive such a request from the mail server 260 and select an IP address from the bank of IP addresses 264 configured for use by email platform (STEP 272). Each of the IP address of the bank of IP addresses 264 may be mapped to a corresponding port identifier (e.g., a postfix service name associated with a particular port) and a hostname. IP selector service 262 may determine a (public) IP address to utilize for sending the email (e.g., an IP address that will be used for NAT when sending communications from the mail server 260 to the destination server 268). The selection of the IP address may be made based on almost any criteria desired such as the destination, (configurable) throttling limits, a reputation metric such as volume of mail sent using the IP address or the presence of any Ips of the bank of IP addresses on a white, grey, or black list, or other data.

The IP selector service 262 can then return the port identifier associated with the selected IP address to the mail server 260 (STEP 274) in response to the request. In some cases, the port identifier may be (or be included in or encompass) an identification of a service (e.g., a service name) associated with the selected IP address. For example, the port identifier may be service name smtp-25000 associated with port 25000 and an IP address 63.71.10.19. After this point a connection may be established to the destination mail server 268 from this selected source IP address.

Based on the port identifier returned, the mail server 260 can send (STEP 276) a HELO or EHLO command (e.g., including or providing) the hostname associated with the selected IP address as the source hostname and sent to the destination port associated with the returned port identifier. Specifically, the mail server 260 can utilize a configuration mapping port identifiers and hostnames at the mail server 260 to determine the hostname associated with the returned port identifier and use that determined hostname as the source hostname for the HELO or EHLO command. The HELO or EHLO command is sent using the identified port (e.g., here 25000) as the destination port. In one embodiment, this HELO or EHLO command may be sent via the named service returned from the IP selector service 262 (e.g., smtp-25000) where that service is adapted to send such a command providing the source hostname mapped to the selected IP address on the destination port mapped to the IP address selected by the IP selector service 262. For example, the mail server 260 may send a HELO or EHLO command providing the hostname mtout-dal-rq-rzx.zixtest.com with port 25000 as the destination port.

Mail sender service 266 is adapted to receive communications on the ports identified. Thus, the HELO or ELHO command sent by the mail server 260 may be received by mail sender service 266 (e.g., on destination port 25000). Mail sender service 266 thus utilizes the port identifier of the port on which the HELO or EHLO command was received to determine a source IP to utilize (e.g., the previously selected IP address) by looking up the IP address mapped to the port identifier (STEP 278). Here, for example, port 25000 on which the HELO or ELHO was received may be used to lookup the IP address of 63.71.10.19 mapped to that port identifier. If a connection has not previously been established to the destination mail server 268 at this point a connection may be established to the destination mail server 268 from this determined source IP address (e.g., 63.71.10.19).

The mail sender service 266 can then facilitate the sending of that HELO or ELHO command from the determined source IP address (e.g., 63.71.10.19) to the destination mail server 268 (STEP 280). As the destination port used to send the HELO or ELHO command from the mail server 260 may be in a special range of ports that are unutilized or are not privileged (e.g., may be non-standard), the mail sender service 266 may override the original destination port of the HELO or ELHO command (e.g., the original destination port associated with the port identifier) to a standard destination port identifier. For example, when the SMTP protocol is utilized, port 25 may be utilized as the standard port identifier, such that when communications are sent they are sent from the selected source IP and specify port 25 as the destination port. With respect to the above example then, the mail sender service 266 may receive a HELO or EHLO command on port 25000 specifying the hostname mtout-dal-rq-rzx.zixtest.com. The mail sender service 266 can then send this HELO or EHLO command specifying the hostname mtout-dal-rq-rzx.zixtest.com to the destination email server 268 from the source IP address 63.71.10.19 (associated with port identifier 25000) on port 25.

Accordingly, destination email server 268 may receive the HELO or EHLO command specifying the source hostname (mtout-dal-rq-rzx.zixtest.com) on the connection with the source IP address (e.g., 63.71.10.19) associated with that hostname. When destination mail server 268 performs an rDNS lookup based on this source IP address (STEP 282), the hostname determined from the rDNS lookup of this source IP address will match the hostname received in the communication. As a result the destination mail server 268 may accept the email and conduct the remaining SMTP conversation to complete the sending of this email (STEP 284).

Figure 3A:
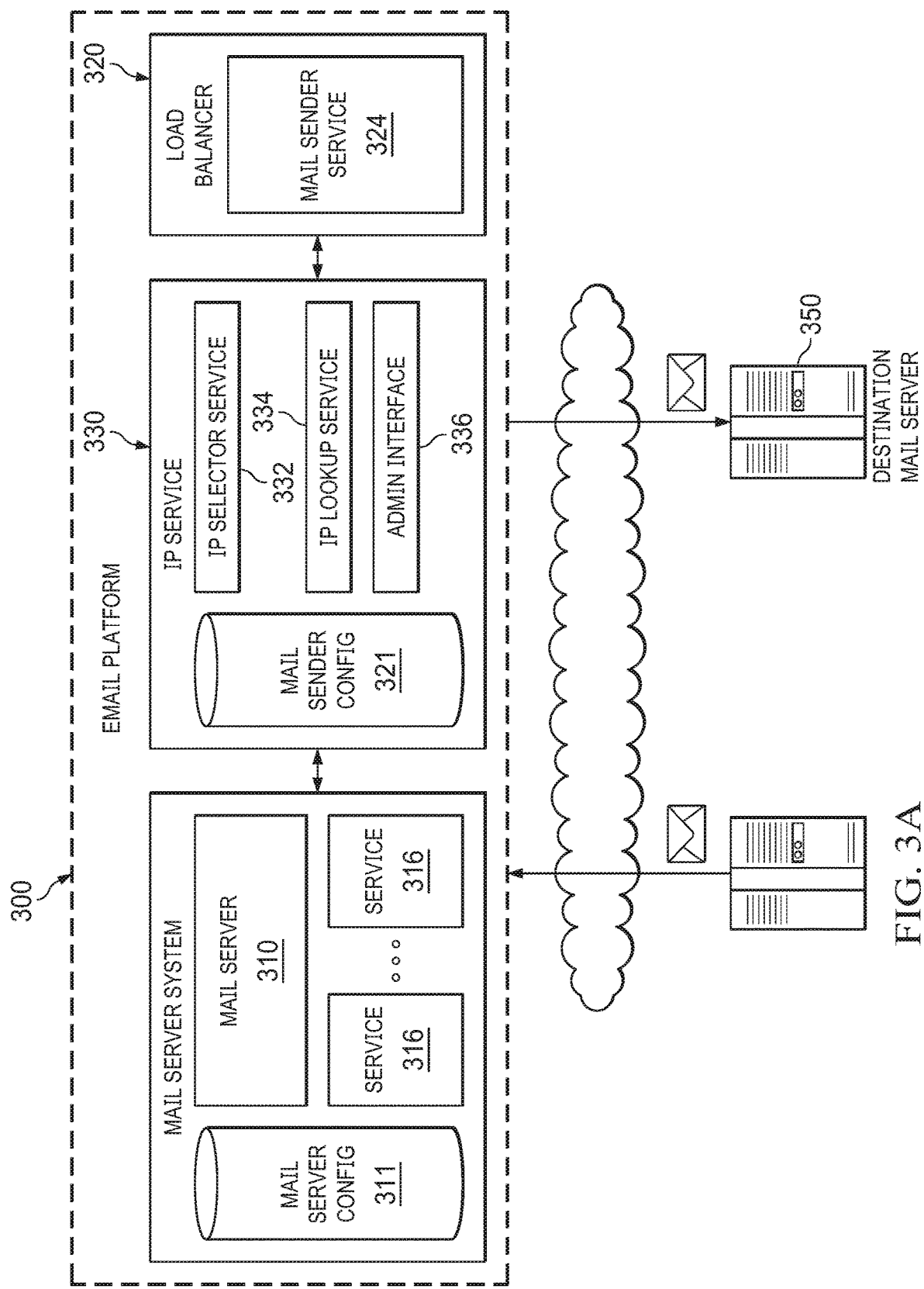
FIG. 3A is a block diagram of a networked computing environment including an embodiment of email platform.

While embodiments have been described with respect to implementation in a load balancer, other embodiments may utilize separate or distinct services (e.g., which may be at separate, distinct or other remote locations, or which may be distinct applications or in distinct containers or (physical or virtual) servers). FIG. 3A depicts a block diagram of a networked computing environment including an embodiment of an email platform for synchronizing hostnames with IP addresses is presented, where IP selection and lookup may be performed in distinct service. In this manner, configuration and implementation of certain elements of an email platform (e.g., such as a load balancer) may be substantially simplified. Additionally, by utilizing separate services the automation of such configuration or selection of such IP address may be greatly increased.

Similar to the embodiments discussed above, email platform 300 may have a bank of public facing IP addresses from which email can be sent. Each of these IP addresses may be associated with hostname, such that the IP address is associated with the hostname in a domain name registry. Here, email platform 300 may include IP service 330 comprising IP selector service 332 and IP lookup service 334. IP service 330 may be configured with mail sender configuration file 321 comprising a lookup table (or other data structure) associating port identifiers with IP addresses and hostnames (e.g., 25000:=helo=mtout-dal-rq-rzx.zixtest-.com; snat_ip=63.71.10.197; next_hop=63.71.10.193%2).

Each mail server 310 of the email platform 300 may be configured accordingly so the same port identifiers are associated with the same hostnames. Such a configuration may be stored in mail server configuration 311 such as in a master.cf file that identifies a set of services 316 of the mail server 310. Each service 316 specified in the master.cf file has a service name associated with (e.g. based on) a corresponding port identifier and is adapted to send communications using the port identifier associated with the name of that service and specifying the hostname associated with that port identifier (e.g., smtp-25000 unix - - n - 250 smtp -o syslog_name=smtp-25000 -o smtp_tcp_port=25000 -o smtp_helo_name=mtout-dal-rq-rzx.zixtest.com).

Thus, data records of the configuration file 321 at the IP service may map a port number, a postfix service name, a hostname, and a public IP for NAT. Each (postfix) mail server 310 is configured with master.cf service entries corresponding to the data records (service name, destination port number, and HELO/EHLO hostname to utilize) at the IP service 330 The port identifier used in the data records may be in a particular range (e.g., a special range that are unutilized or not privileged ports such as 25000-25999). Mail sender service 324 at the load balancer 320 may thus be configured to detect connections from mail servers 310 to destination ports in the special range of port identifiers mapped in the data records.

Thus, when email platform 300 receives an email to be sent to a destination 350, that email may be routed to a mail server 310 of the email platform 300. The mail server 310 can then request an identifier from the IP selector service 332 of the IP service 330. For example, IP selector service 332 may be TCP based service configured as a listener on a port associated with a table lookup command. The mail server 310 can issue a transport lookup or the like using a tcp table lookup command which can specify the destination for the email which is being sent.

The IP selector service 332 can thus receive such a table lookup command from the mail server 310. Based on this table lookup command specifying the destination for the email, the IP selector service can determine an IP address from the configuration file 321 (e.g., the data records including IP addresses mapped to port identifiers and hostnames) to utilize for sending the email to the destination. Specifically, IP selector 332 may determine a (public) IP address (with an associated hostname) to utilize for sending the email (e.g., an IP address that will be used for NAT when sending communications from the mail server 310 to the destination). The selection of the IP address may be made based on almost any criteria desired. For example, a current reputation or other data (e.g., statistics) associated with the each (or a subset) of the bank of IP addresses as maintained by the email sending platform 300 or as obtained from third party source may be utilized in such IP selection. As some examples, IP selection may be based on the destination, throttling limits, a reputation metric such as volume of mail sent using the IP address or the presence of the IP on a grey or black list, or other data.

To aid in the configuration or selection of IP addresses, IP service 330 may include administrative interface 336. This interface may include one or more management or administrative interfaces for configuring or accessing data associated with IP service 330, such as a web based (e.g., graphical) user interface or a network based Application Programming Interface (such as a REST interface or the like). Thus, a user associated with email platform 300 may utilize such an administrative interface 336 to, for example, adjust or configure the IP addresses of the bank of IP addresses utilized by the email platform 330, monitor usage of the email platform 300 (e.g., of IP addresses used by the platform), adjust, or define IP selection rules (e.g., algorithms) or perform other configuration or access to the IP service 300 or associated data. Such an administrative interface 336 may provide an increased, and finer granularity control over the capability to automate aspects of the IP selection process such as the warming or cooling of IP address, as well as more security and auditing for any changes made.

When an IP address is selected by the IP selector service 332, the IP service 332 may access the configuration file 321 to determine the port identifier associated with the selected IP address. This port identifier can then be returned to the mail server 310 in response to the request (e.g., lookup command) issued by the mail server 310. In some cases, the port identifier may be (or be included in or encompass) an identification of a service (e.g., a service name), or may be used to construct the name of a service, that is adapted to utilize the identified port as the destination port when sending communications. Thus, a service name associated with the port identifier may be returned from the IP selector 332 to the mail server 310 (e.g., service name "smtp-25000", identifying a service adapted to send communications to destination port 25000 identifying the hostname mtout-dal-rq-rzx.zixtest.com associated with IP address 63.71.10.19, as illustrated above).

Based on the response (e.g., the port identifier) from IP selector service 332 the mail server 310 can send a communication (e.g., HELO or EHLO command) for sending the email using (e.g., including or providing) the hostname associated with the source IP address selected at IP selector service 332, where the communication is sent using the identified port as the destination port for the communication. Specifically, the mail server 310 can utilize mail server configuration 311 mapping port identifiers and hostnames as configured at the mail server 310 to determine the hostname associated with the port identifier and use that determined hostname as the source hostname for the communication.

In one embodiment, the mail server 310 may use the service 316 identified by the returned port identifier to send the communication. This communication can be a HELO or EHLO command to the destination email server 350 at the destination for the email. This communication may be sent on the port identified by the port identifier in the range of port identifiers on which a mail sender service 324 of the load balancer 320 is adapted to detect connections.

Accordingly, the load balancer 320 may receive communications for sending emails from the mail servers 310 at the email platform 300. These communication may be received by mail sender service 324 on the range of ports for which it is configured to listen (e.g., ports 25000-25999). When a communication for sending an email originating at mail server 310 is received at the mail sender service 324 of load balancer 320, the mail sender service 324 can determine the destination port associated with the received communication.

This determination can be made, for example, based on the port in the special range on which the mail sender service 324 detected the communication from the mail server 210. In this embodiment, mail sender service 324 at the load balancer may utilize IP lookup service 334 provided by IP service 330. IP lookup service 334 may be adapted to receive requests specifying port identifiers and return an associated IP address to be utilized for NAT. Accordingly, mail sender service 324 may send a request to IP lookup service 334 specifying the port identifier of the communication received from the mail server 310 (e.g., the destination port on which the communication from the mail server 310 was received). Based on the port identifier associated with the request, the IP lookup service 334 may access the mail sender configuration 321 to determine the associated source (public) IP address associated with the port identifier (e.g., the previously selected source IP for sending that email that should be used for NAT). This IP address can then be returned by the IP lookup service 334 to the mail sender service 324 at the load balancer 320 in response to the request.

The mail sender service 324 can then facilitate the sending of the communication from the returned source IP address. In sending the communication, the mail sender service 224 may override the destination port of the received communication (e.g., the original destination port associated with the port identifier) to a standard destination port identifier. For example, when the SMTP protocol is utilized, port 25 may be utilized as the standard port identifier, such that when communications are sent they are sent from the selected source IP and specify port 25 as the destination port.

Figure 3B:
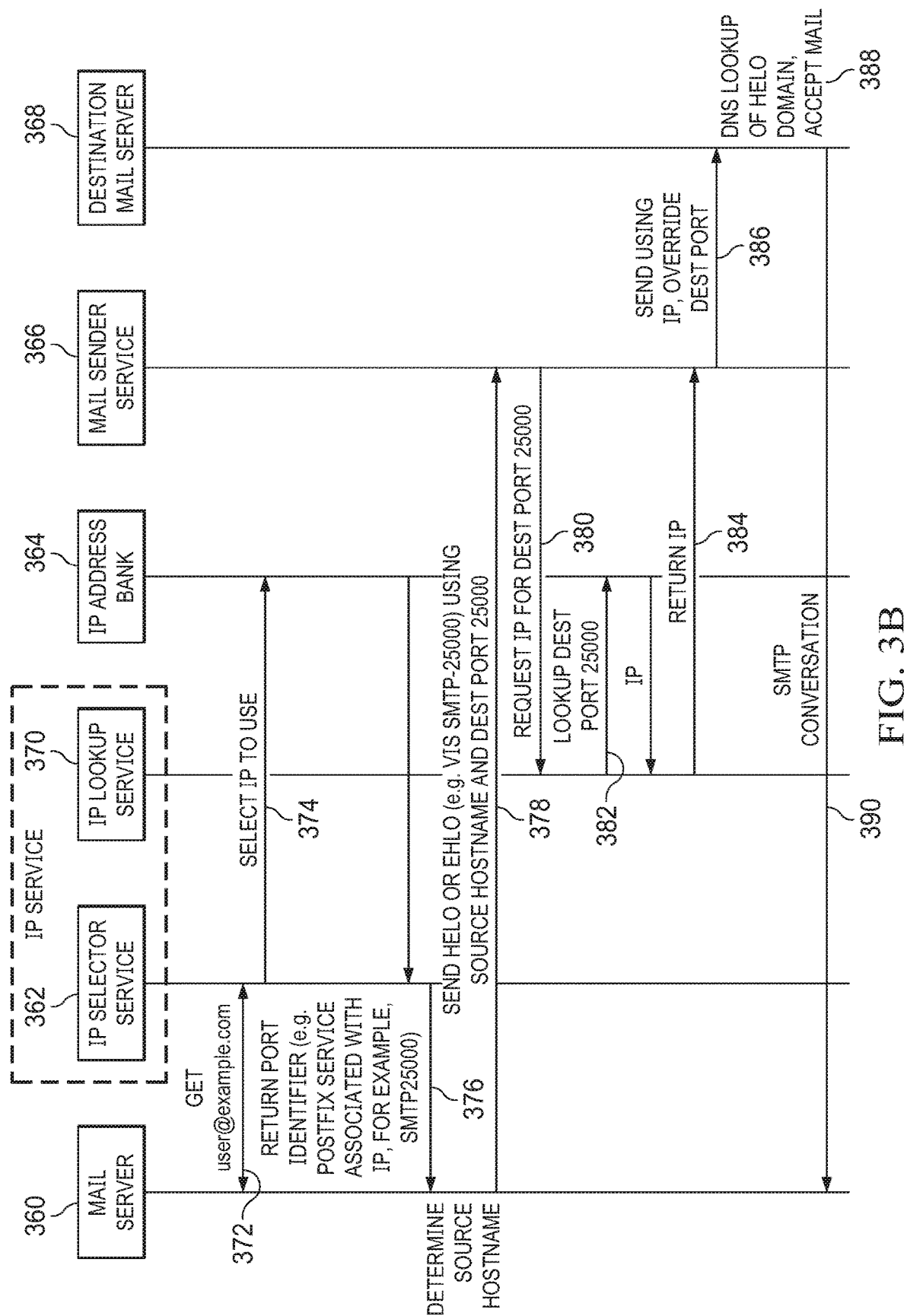
FIG. 3B is a flow diagram of one embodiment of synchronizing IP addresses and hostname in an email platform.

Embodiments may be understood with reference to FIG. 3B which depicts a flow diagram of one embodiment of synchronizing IP addresses and hostname in an email platform with an IP service. When an email platform receives an email to be sent to a destination (e.g., user@example.com) the email may be routed to a mail server 360, which may be a postfix server or the like operating according to the SMTP protocol. The mail server 360 may send a request (STEP 372) including a table lookup command or the like to the IP selector service 362, which may be TCP based service configured as a listener on a port associated with such a table lookup command. The request may specify the destination (or a portion thereof such as username and domain, just domain data, etc.) for the email which is being sent (e.g., here user@example.com).

The IP selector service 362 can receive such a request from the mail server 360 and select an IP address from the bank of IP addresses 364 configured for use by email platform (STEP 374). Each IP address of the bank of IP addresses 374 may be mapped to a corresponding port identifier (e.g., a postfix service name associated with a particular port) and a hostname. IP selector service 362 may determine a (public) IP address to utilize for sending the email (e.g., an IP address that will be used for NAT when sending communications from the mail server 360 to the destination server 368). The selection of the IP address may be made based on almost any criteria desired as discussed herein.

The IP selector service 362 can then return the port identifier associated with the selected IP address to the mail server 360 (STEP 376) in response to the request. In some cases, the port identifier may be (or be included in or encompass) an identification of a service (e.g., a service name) associated with the selected IP address. For example, the port identifier may be service name smtp-25000 associated with port 25000 and an IP address 63.71.10.19.

Based on the port identifier returned, the mail server 360 can send (STEP 378) a HELO or EHLO command (e.g., including or providing) the hostname associated with the selected IP address as the source hostname and sent to the destination port associated with the returned port identifier. Specifically, the mail server 360 can utilize a configuration mapping port identifiers and hostnames at the mail server 360 to determine the hostname associated with the returned port identifier and use that determined hostname as the source hostname for the HELO or EHLO command. The HELO or EHLO command is sent using the identified port (e.g., here 25000) as the destination port. In one embodiment, this HELO or EHLO command may be sent via the named service returned from the IP selector service 262 (e.g., smtp-25000) where that service is adapted to send such a command providing the source hostname mapped to the selected IP address on the destination port mapped to the IP address selected by the IP selector service 362. For example, the mail server 360 may send a HELO or EHLO command providing the hostname mtout-dal-rq-rzx.zixtest.com with port 25000 as the destination port.

Mail sender service 366 (e.g., at a load balancer) is adapted to receive communications on the ports identified Thus, the HELO or ELHO command sent by the mail server 260 may be received by mail sender service 366 (e.g., on destination port 25000). Mail sender service 366 thus utilizes the port identifier of the port on which the HELO or EHLO command was received to determine a source IP to utilize (e.g., the previously selected IP address) by looking up the IP address mapped to the port identifier (STEP 378).

In this case, the mail sender service 366 may utilize IP lookup service 370 provided by an IP service 330. Accordingly, mail sender service 366 may send (STEP 380) a request to IP lookup service 370 specifying the port identifier (e.g., here 25000) of the HELO or EHLO command received from the mail server 360 (e.g., the destination port on which the HELO or EHLO command from the mail server 360 was received). The IP lookup service 370 may access the IP address bank based on the port identifier associated with the request to determine the associated source (public) IP address associated with the port identifier (e.g., the previously selected source IP for sending that email that should be used for NAT) (STEP 382). Here, for example, port 25000 on which the HELO or ELHO was received may be used to lookup the IP address of 63.71.10.19 mapped to that port identifier. This IP address (e.g., 63.71.10.19) can then be returned by the IP lookup service 370 to the mail sender service 366 (e.g., at the load balancer) in response to the request from mail sender service 366 (STEP 384).

When the mail sender service 366 receives the source IP address to utilize, the mail sender service 366 a connection may be established to the destination mail server 368 from this determined source IP address (e.g., 63.71.10.19). The mail sender service 366 can then facilitate the sending of that HELO or ELHO command from the determined source IP address (e.g., 63.71.10.19) to the destination mail server 368 (STEP 386). The mail sender service 366 may override the original destination port of the received HELO or ELHO command (e.g., the original destination port associated with the port identifier) to a standard destination port identifier such as port 25. With respect to the above example illustrated, the mail sender service 366 may receive a HELO or EHLO command on port 25000 specifying the hostname mtout-dal-rq-rzx.zixtest.com. The mail sender service 366 can then send this HELO or EHLO command specifying the hostname mtout-dal-rq-rzx.zixtest.com to the destination email server 368 from the source IP address 63.71.10.19 (associated with port identifier 25000) on port 25.

Accordingly, destination email server 368 may receive the HELO or EHLO command specifying the source hostname (mtout-dal-rq-rzx.zixtest.com) on the connection with the source IP address (e.g., 63.71.10.19) associated with that hostname. When destination mail server 368 performs an rDNS lookup based on this source IP address (STEP 368), the hostname determined from the rDNS lookup of this source IP address will match the hostname received in the communication. As a result the destination mail server 368 may accept the email and conduct the remaining SMTP conversation to complete the sending of this email (STEP 390).

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines, or portions thereof described herein, where such software programming or code can be stored in a computer-readable medium and can be operated on by a processor to permit a computer to perform any of the steps, operations, methods, routines, or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals, or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a set", "a" or "an" (and "the" when antecedent basis is "a" or "an") includes both singular and plural of such term, unless clearly indicated otherwise (i.e., that the reference "a set", "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A method for sending electronic mail, comprising:
   receiving, at a mail sender, an email to be sent to a destination;
   requesting, from the mail sender, mail sending data for the email;
   receiving the request for mail sending data from the mail sender at a first location remote from the mail sender;
   selecting, at the first location remote from the mail sender, a source IP address for sending the email;
   determining, at the first location remote from the mail sender, a port identifier corresponding to the selected source IP address;
   returning the determined port identifier to the mail sender from the first location remote from the mail sender;
   receiving, at the mail sender, the determined port identifier;
   determining, at the mail sender, a source hostname based on the port identifier received from the first location remote from the mail sender;
   sending, by the mail sender, one or more communications for sending the email to the destination, the one or more communications associated with the determined source hostname and the received port identifier;
   and receiving the one or more communications at a second location remote from the mail sender;
   at the second location remote from the mail sender, sending the one or more received communications to the destination from the source IP address utilizing a standard destination port identifier in place of the port identifier associated with the communications, wherein the source IP address was determined at the second location in response to receiving the one or more communications associated with the port identifier.

2. The method of claim 1, wherein the first location remote from the mail sender and the second location remote from the mail sender are at same location.

3. The method of claim 2, wherein the same location comprises a load balancer.

4. The method of claim 1, wherein the first location remote from the mail sender includes a mail demultiplexer service and the second location remote from the mail sender includes a load balancer.

5. The method of claim 1, wherein the mail sender is a postfix mail server.

6. The method of claim 5, wherein the request from the mail sender for mail sending data is a postmap request.

7. The method of claim 5, wherein the determined port identifier is included in a service name returned to the mail sender.

8. The method of claim 7, wherein the source hostname is associated with the service name returned to the mail sender.

9. The method of claim 8, wherein sending the one or more communications from the mail sender comprises calling a service corresponding to the service name, the service adapted to send the communications on the determined port identifier in association with the source hostname.

10. The method of claim 1, wherein sending the one or more communications comprises initiating, by the mail sender, a connection to the destination on the received port identifier using at least one communication specifying the source hostname.

11. The method of claim 10, wherein initiating the connection comprises issuing, from the mail sender, a HELO or EHLO command including the source hostname associated with the received port identifier.

12. The method of claim 1, wherein selecting the source IP address comprises evaluating a reputation of one or more of a set of source IP addresses and selecting the source IP address from the set of source IP addresses based on the evaluation.

13. A system for sending electronic mail, comprising:
   a processor; and a non-transitory computer readable medium, comprising instructions for:
   receiving, at a mail sender, an email to be sent to a destination;
   requesting, from the mail sender, mail sending data for the email;
   receiving the request for mail sending data from the mail sender at a first location remote from the mail sender;
   selecting, at the first location remote from the mail sender, a source IP address for sending the email;
   determining, at the first location remote from the mail sender, a port identifier corresponding to the selected source IP address;
   returning the determined port identifier to the mail sender from the first location remote from the mail sender;
   receiving, at the mail sender, the determined port identifier;
   determining, at the mail sender, a source hostname based on the port identifier received from the first location remote from the mail sender;
   sending, by the mail sender, one or more communications for sending the email to the destination, the one or more communications associated with the determined source hostname and the received port identifier;
   and receiving the one or more communications at a second location remote from the mail sender;
   at the second location remote from the mail sender, sending the one or more received communications to the destination from the source IP address utilizing a standard destination port identifier in place of the port identifier associated with the communications, wherein the source IP address was determined at the second location in response to receiving the one or more communications associated with the port identifier.

14. The system of claim 13, wherein the first location remote from the mail sender and the second location remote from the mail sender are at a same location.

15. The system of claim 14, wherein the same location comprises a load balancer.

16. The system of claim 13, wherein the first location remote from the mail sender includes a mail demultiplexer service and the second location remote from the mail sender includes a load balancer.

17. The system of claim 13, wherein the mail sender is a postfix mail server.

18. The system of claim 17, wherein the request from the mail sender for mail sending data is a postmap request.

19. The system of claim 17, wherein the determined port identifier is included in a service name returned to the mail sender.

20. The system of claim 19, wherein the source hostname is associated with the service name returned to the mail sender.

21. The system of claim 20, wherein sending the one or more communications from the mail sender comprises calling a service corresponding to the service name, the service adapted to send the communications on the determined port identifier in association with the source hostname.

22. The system of claim 21, wherein sending the one or more communications comprises initiating, by the mail sender, a connection to the destination on the received port identifier using at least one communication specifying the source hostname.

23. The system of claim 22, wherein initiating the connection comprises issuing, from the mail sender, a HELO or EHLO command including the source hostname associated with the received port identifier.

24. The system of claim 13, wherein selecting the source IP address comprises evaluating a reputation of one or more of a set of source IP addresses and selecting the source IP address from the set of source IP addresses based on the evaluation.

* * * * *